C. C. McCORMICK.
EGG TESTER.
APPLICATION FILED MAR. 12, 1917.

1,266,695.

Patented May 21, 1918.

Inventor
C. C. McCormick,
By C. L. Parker, Attorney

UNITED STATES PATENT OFFICE.

CHARLES C. McCORMICK, OF AURORA, MISSOURI.

EGG-TESTER.

1,266,695.

Specification of Letters Patent.     Patented May 21, 1918.

Application filed March 12, 1917.   Serial No. 154,344.

*To all whom it may concern:*

Be it known that I, CHARLES C. McCORMICK, a citizen of the United States, residing at Aurora, in the county of Lawrence and State of Missouri, have invented certain new and useful Improvements in Egg-Testers, of which the following is a specification.

My invention relates to improvements in egg testers, of the general type, which embody an electric lamp, and means operated by contact with the egg to be tested for closing a circuit and causing the lamp to glow.

The invention aims to provide an egg tester of the above mentioned character, which is of highly simplified construction, inexpensive to manufacture, strong and durable.

Other objects and advantages of the invention will be apparent during the course of the following description.

Figure 1:
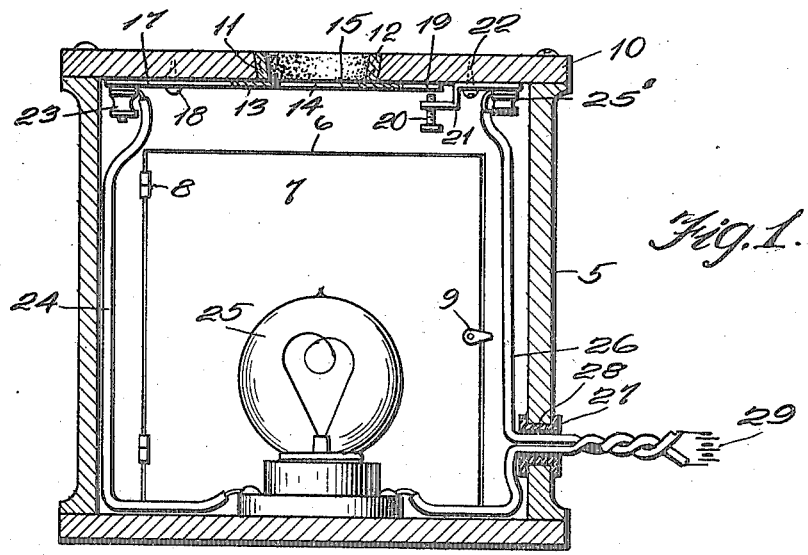
Figure 2:
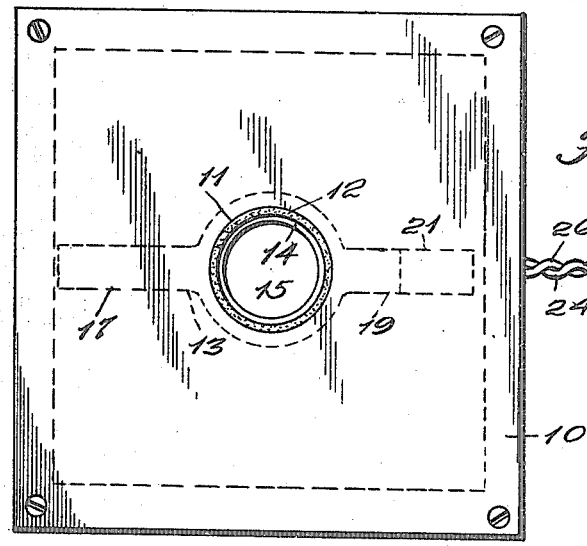
Figure 3:
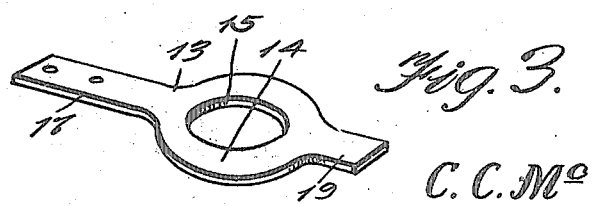

In the accompanying drawings forming a part of this specification and in which like numerals are employed to designate like parts throughout the same, Figure 1 is a central vertical sectional view through an apparatus embodying my invention, Fig. 2 is a plan view of the same, and, Fig. 3 is a perspective view of a combined contact and light obstructing member.

In the drawings, wherein for the purpose of illustration is shown a preferred embodiment of my invention, the numeral 5 designates a casing, which is shown as rectangular for the purpose of illustration, while it is obvious that the casing may be made in any suitable shape or size as may be desired. This casing may be formed of wood or any other suitable material. The casing 5 has one side thereof provided with an opening 6, which is normally closed by a door 7, hinged thereto as shown at 8, and held in the closed position by a latch 9 of any suitable construction.

The casing 5 has its top 10 provided with an egg receiving opening 11, the wall of which is preferably faced with fibrous material, such as felt 12, to prevent injury to the egg. While I have shown but one of these egg receiving openings it is obvious that any suitable number may be employed.

Arranged near and beneath the egg receiving opening 11 is a resilient combined contact and light obstructing member 13, which is preferably in the form of a strip of copper or other metal, provided between its ends with an enlarged preferably circular portion 14, having a centrally arranged opening 15, for receiving the end of the egg and for the passage of light. The member 13 has its enlarged portion 14 disposed concentrically with respect to the opening 11 and particular attention is called to the fact that the periphery of the enlarged portion 14 overlaps and extends radially beyond the wall of the opening 11, for a substantial distance. As light travels in a straight path, the light from the lamp will not pass between the outer edge of the enlarged portion 14 and the wall of the opening 11, but the light will pass through the opening 15 and be applied to the central portion of the egg.

One arm 17 of the member 13 is secured to the top 10 by means of a screw or screws 18, while the opposite arm 19 thereof is adapted to move toward and away from an adjustable contact 20. This adjustable contact is carried by a metallic bracket 21, secured to the top 10 by screws 22 or the like.

Connected with the arm 17 by means of a binding post 23 or the like is a wire 24, having an electric lamp 25 connected in series therewith. Connected with the bracket 21 by means of a binding post 25 or the like is a wire 26. The wires 24 and 26 pass through an insulating sleeve 27 disposed in an opening 28, and these wires are connected with the opposite poles of a source of current 29. The source of current may be a battery, dynamo, or a supply line.

In operation, the device 13 is normally in the upper position, as shown in Fig. 1, and the arm 19 disengages the adjustable contact 20. When the egg is inserted within the opening 11 the end thereof enters the opening 15 and contacts with the enlarged portion 14, forcing it downwardly away from the top 10 and bringing the arm 19 into contact with the contact point 20, thus closing a circuit and causing the lamp 25 to glow. In this closed circuit current flows from one pole of the source of current 29 through wire 26, binding post 25, bracket 21, contact 20, member 13, binding post 23, a portion of wire 24, lamp 25, and a portion of wire 24 back to the opposite pole of the source of current. When the member 13 is moved away from the top 10, the same overlapping the edges of the opening 11, serves to effectually prevent the light passing to the point of contact of the egg and lining 12 and thus causing the light passing from the lamp 25 to discharge through opening 15, thereby being concentrated upon the central portion of the egg.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, what I claim is:

The combination with a casing provided with an egg receiving opening; of a relatively narrow strip of resilient sheet metal arranged within the casing and having one end thereof secured to the casing, said strip being provided between its ends with a laterally enlarged portion disposed near and beneath the egg receiving opening and projecting laterally beyond the same for spanning the wall thereof to function as a light obstructing means, said laterally enlarged portion being provided with an opening having communication with said egg receiving opening; a stationary contact secured to the casing and arranged near the opposite end of the strip to contact therewith; an electric lamp arranged within the casing; and a circuit connecting the strip, stationary contact, and electric lamp.

In testimony whereof I affix my signature in presence of witnesses.

CHARLES C. McCORMICK.

Witnesses:
JAMES A. POTTER,
D. V. McPHERSON,
JOHN W. LEAKE.

Copies of this patent may be obtained for five cents each, by addressing the "Commissioner of Patents, Washington, D. C."